Patented Feb. 2, 1926.

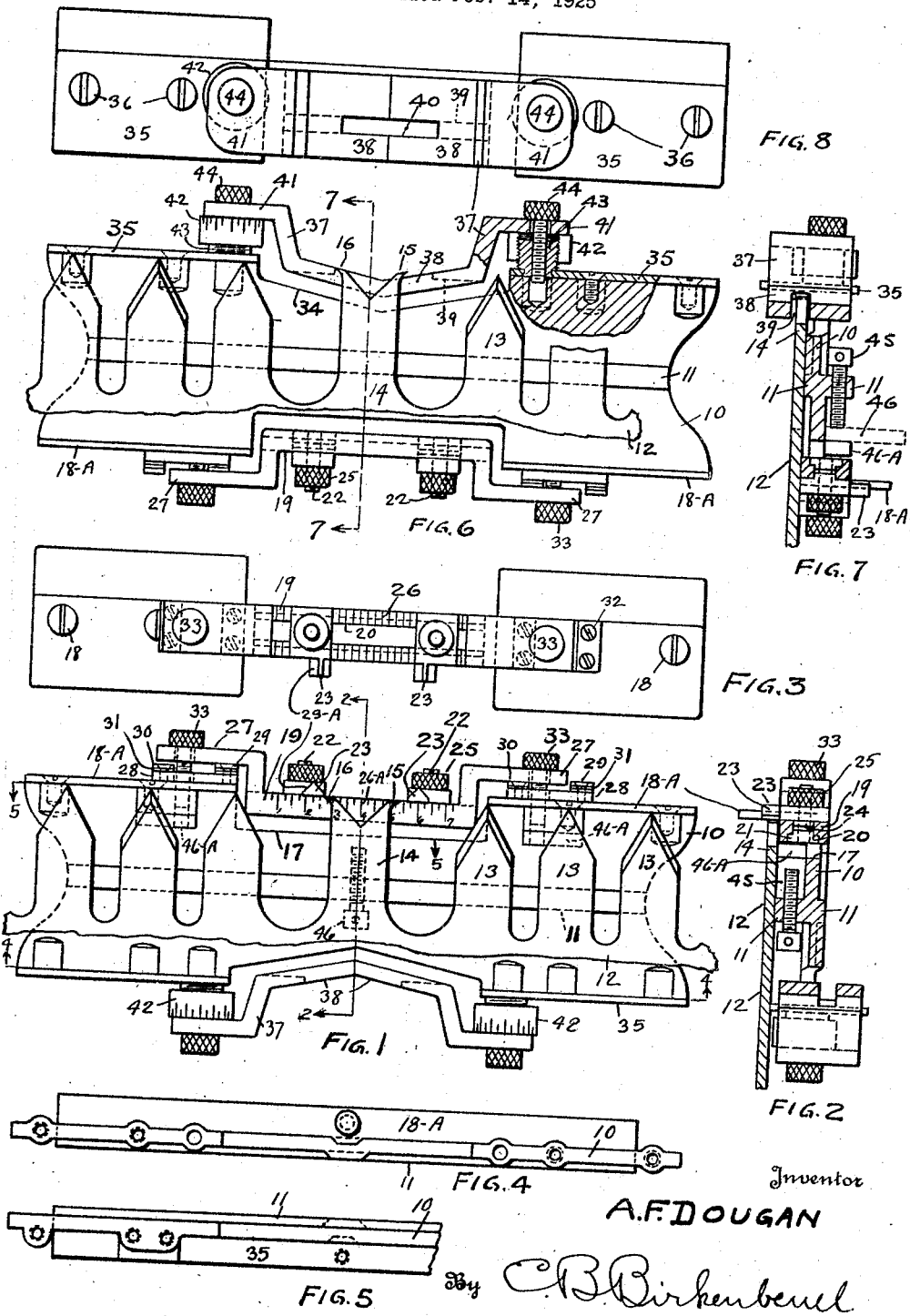

1,571,397

UNITED STATES PATENT OFFICE.

ARCHIE F. DOUGAN, OF COCHRAN, OREGON, ASSIGNOR OF ONE-HALF TO PETE HANSEN, OF COCHRAN, OREGON.

SAW GAUGE.

Application filed February 14, 1925. Serial No. 9,179.

*To all whom it may concern:*

Be it hereby known that I, ARCHIE F. DOUGAN, a citizen of the United States, and a resident of Cochran, in the county of Washington, State of Oregon, have invented a new and useful Saw Gauge, of which the following is a specification.

This invention relates generally to the art of sharpening saws, and particularly to the sharpening of bucking, falling and drag saws such as are used by loggers.

The first object of the invention is to produce a saw gauge which will have a wide range of usefulness, that is to say, will be able to handle all kinds of saws.

The second object is to product a gauge with which it will be possible to accurately gauge a saw for swedging, sharpening and lead of the raker teeth.

The third object is to render the raker teeth visible while swedging.

The fourth object is to permit the filer to see which teeth need the most swedging.

The fifth object is to permit an easy change from the gauging of falling and bucking saws to the gauging of drag saws.

The sixth object is to provide a reversible swedging square which shows the condition of the raker teeth in two planes.

The seventh object is to secure complete uniformity in the raker teeth, thereby greatly improving the cutting property of the saw.

The eighth object is to cause the rakers to be sharpened at exactly the same angle and at exactly the same length, except where lead is desired.

The ninth object is to permit the amount of lead employed on a given saw to be specified and attained with the greatest accuracy and without any guess work.

The tenth object is to permit both sides of the rakers to be sharpened at the same operation.

I accomplish these results in the manner set forth in the following specification as illustrated in the accompanying drawing, in which:

Figure 1 is a front elevation of the gauge showing a saw having its rakers swedged. Figure 2 is a transverse section taken along the line 2—2 in Figure 1. Figure 3 is a plan of Figure 1. Figure 4 is a bottom view of Figure 1 taken along the line 4—4 just inside of the plates. Figure 5 is a fragmentary top view of Figure 1 taken along the line 5—5 just inside of the plates. Figure 6 is a side view of the gauge showing a saw having its rakers filed. Figure 7 is a transverse section taken along the line 7—7 in Figure 6. Figure 8 is a plan of Figure 6.

Similar numbers of reference refer to the same parts throughout the several views.

Referring in detail to the drawing, the device itself is built up on a central frame member 10 having a machined rib 11 along each side near its middle.

*Swedging side of gauge.*

In Figures 1 to 3 that portion of the gauge which deals with the swedging operation is illustrated in connection with a saw 12 which is provided with cutting teeth 13 and raker teeth 14, each of which is provided with cutting edges 15 and 16.

Near the middle of one side of the frame 10, which is preferably of aluminum, is formed a recess 17. On each side of the recess 17 and secured to the frame 10 by means of the screws 18 are the hardened steel plates 18<sup>A</sup>.

Bridging the gap between the plates 18<sup>A</sup> is a U-shaped swedging gauge 19 having formed on its under side a T slot 20 in which are slidably placed the heads 21 of the bolts 22 on which are placed the swedging gauge arms 23, each of which has a rib 24 formed on its under side adapted to hold its respective arm snugly and squarely with relation to the member 14 by engagement with the slot 20. Knurled nuts 25 on the bolts 22 hold the gauge arms 23 in place. The upper sides 23<sup>A</sup> of the gauge arms 23 are preferably bevelled, as indicated.

The member 19 is preferably graduated with the marks 26 and the corresponding marks 26<sup>A</sup>. On the sides of the member 19 is preferably given some reference number, as indicated in Figure 1. The ends 27 of the member 19 are supported on the blocks 28, each of which is provided with the raised face plates 29 and 30, which may be varied in height by the use of shims 31. Screws 32 are used to hold the face plates 29 and 30 and their shims 31 to the blocks 28. A screw 33 passes loosely through the holes in each of the ends 27 and screws into the frame 10.

*Gauge for sharpening rakers.*

In Figures 6 and 7 is illustrated the saw 12 undergoing the sharpening of its raker teeth. This side of the gauge is provided with a somewhat flat V-shaped recess 34 in the frame 10, at each side of which is secured the hardened plate 35 by means of the screws 36.

The sharpening gauge 37, which might also be called the chisel slot side of the gauge, consists of a V-shaped member having the sloping bottoms 38 of a hard material, whose faces are formed at an angle equal to the angle at which a raker tooth should be sharpened. A slot 39 is formed in the under side of the bottom 38 and the slot 40 extends upwardly from the slot 39 through the bottom 38. The ends 41 rest on the internally threaded sleeves 42 which are threaded into the studs 43 which are secured to the plates 35.

Knurled screws 44 pass through the ends 41 and thread into the studs 43. The members 42 are preferably graduated and extend slightly beyond the ends 41 to facilitate adjustment. The usual screw 45 is employed to hold the file 46 against the spaced lugs 46^A. The file 46 is used to join the teeth 13 when required.

It will be observed that on one side of the gauge is provided a screw adjustment for the member 38 and on the other side is provided a pair of reversible blocks adapted to be shimmed to different heights. In practice, any device capable of adjusting the height of the members 19 or 38 could be used, although the screw form is probably the most desirable.

The operation of the device is as follows: Assuming that the side cutting teeth 13 of a saw have been properly joined, the first operation to perform is to properly swedge the raker teeth. This is done, as is well known, by means of a suitable swedging tool or hammer, some operators preferring to work in one direction, some in another and some in both. The gauge arms 23 are set at the desired point on the sloping member 19 and clamped in position and the points 15 and 16 are swedged until it is just possible to pass the gauge arm over the point.

It will be observed that on account of being on a slope that a number of heights of rakers can be gauged by merely altering the position of the gauge arm along the slope. For values greater than can be secured on a given slope of the member 19, the slope is increased by rearranging the members 28. This makes it possible to cover a wide variety of lengths of raker without adjusting the slope of the member 19 to take care of outside values or heights of raker by merely altering the slope.

After all of the rakers have been swedged as above described, the gauge is reversed to the position shown in Figure 6 and one point 16 of a raker tooth is brought against the end of the slot 40, leaving a portion of the newly swedged tooth projecting above the hardened sloping face of the bottom 38. The operator now merely files off the projecting end of the tooth and then moves the gauge so that the point 15 engages its end of the slot, and repeats the operation. Whatever lead is required is attained by the accurate adjustment of the sleeves 42. The remaining operations of sharpening the saw are as is now customary.

It can readily be seen that the raker teeth may easily be swedged squarely with the aid of the arms 23, which act as tri-squares both in vertical and horizontal planes, and that the swedger is enabled to correct existing discrepancies in the raker teeth very readily, since these teeth are always visible while being swedged.

It will also be seen that the filer need only be careful to set his raker filing gauge in the correct position when starting, after which every tooth will have its cutting edge filed at the same angle and at exactly the same height as has the corresponding edge on the adjacent teeth, making it possible for a saw filer to do good work in a poorer light with much less eye strain and for a greater length of time than is possible under the old system of sharpening.

It will be understood that the spaced lugs 46^A permit the file 46 to be curved slightly under the pressure of the screw 45 to correspond with the curvature of the saw.

In the past it has been customary to file the points of the rakers squarely across over a flat gauge and then to file them to a point with the aid of the eye, which naturally made it difficult to secure a uniform length of raker and almost impossible to secure a uniform angle at the point of the tooth. This difficulty is overcome in the present invention by supplying a hardened filing surface, which at once insures a correct angle for the tooth point and an absolutely accurate length of tooth.

I am aware that many forms of saw gauges have been constructed in the past, I therefore do not claim such tools broadly, but I do intend to cover all such forms and modifications as fall fairly within the appended claims.

I claim:

1. In a saw gauge, the combination of a frame; spaced plates on said frame adapted to engage saw teeth; a guide means for tiltably supporting said guide on said frame between said plates; and swedging gauge arms slidably mounted on said guide and adapted to gauge the height to which a raker tooth should be swedged.

2. In a saw gauge, the combination of a frame having a recess formed on one side thereof having tooth-engaging plates secured on each side of said recess; a guide means for tiltably supporting said guide on said frame between said plates; means for adjusting the angle of inclination of said guide; and swedging gauge arms slidably mounted on said guide and adapted to gauge the height to which a raker tooth should be swedged prior to sharpening.

3. In a saw gauge, the combination of a frame having spaced tooth-engaging plates secured thereto; a guide means for tiltably supporting said guide on said frame across said plates; means for varying the amount of inclination of said guide; a pair of slidable arms on said guide, said arms having beveled lateral faces and having their lower edges perpendicular to the saw-engaging side of said frame.

4. In a saw gauge, the combination of a frame having a tooth-engaging shoulder; an adjustable V-shaped filing gauge mounted on said frame, the angles of said gauge corresponding with the angles at which raker teeth should be sharpened, said gauge having a slot formed therein adapted to receive the raker teeth of a saw, said slot having its ends serve as stops for said gauge against the raker teeth in a manner that a slight portion of said teeth will project through said slot in order that they may be filed to uniform height and angle.

5. In a saw gauge, the combination of a frame having spaced tooth-engaging plates; an adjustable V-shaped filing gauge on said frame between said plates, said gauge having means for adjusting its relation to said frame; and having a slot formed therein adapted to receive the raker teeth of a saw, one end of said slot being on one side of said V-shaped member and the other end being on the other side thereof, said slot ends forming stops for said gauge against said teeth and permitting a small portion thereof to project through said slot, the faces of said V-shaped member limiting the amount said raker tooth can be shortened and controlling the angle of sharpening.

6. In a saw gauge, the combination of a frame; a graduated guide means for tiltably supporting said guide on said frame; projecting swedging gauge arms slidably mounted on said guide and adapted to indicate the correct amount a raker tooth should be swedged and to show up irregular swedging; a gauge for sharpening raker teeth consisting of a V-shaped plate adjustably attached to said frame on the opposite side from said swedging frame, said plate having a slot formed therein whose ends act as stops for said gauge against previously swedged teeth; and means for indicating the parallel adjustment between said sharpening plate and frame.

ARCHIE F. DOUGAN.